United States Patent [19]
Hosoya

[11] Patent Number: 5,469,546
[45] Date of Patent: Nov. 21, 1995

[54] METHOD FOR RETRYING RECORDING INFORMATION INTO A NEXT LOGICAL BLOCK BY SENDING SENSE DATA INCLUDING ADDRESS INFORMATION TO HOST COMPUTER AND RESPONDING TO COMMAND THEREFROM

[75] Inventor: Hideki Hosoya, Yokohama, Japan

[73] Assignee: Canon Kabushiki Kaisha, Tokyo, Japan

[21] Appl. No.: 915,659

[22] Filed: Jul. 21, 1992

[30] Foreign Application Priority Data

Jul. 23, 1991 [JP] Japan .................... 3-205660

[51] Int. Cl.$^6$ ............................ G06F 11/00; G06F 11/16
[52] U.S. Cl. .................... 395/182.06; 395/439; 395/442; 369/54; 369/56; 369/58; 371/10.2; 364/245.3; 364/249.4; 364/259.3
[58] Field of Search ................... 395/275, 275, 395/4251575; 360/53, 39, 51, 48; 369/32, 58, 54, 56; 371/37.4, 10.2

[56] References Cited

U.S. PATENT DOCUMENTS

| | | | |
|---|---|---|---|
| 3,800,281 | 3/1974 | Devore et al. | 371/37.4 |
| 4,901,232 | 2/1990 | Harrington et al. | 395/275 |
| 5,111,444 | 5/1992 | Fukushima et al. | 369/58 |
| 5,195,094 | 3/1993 | Miyasaka | 371/13 |
| 5,218,590 | 6/1993 | Miyasaka | 369/54 |
| 5,237,553 | 8/1993 | Fukushima et al. | 369/58 |

FOREIGN PATENT DOCUMENTS

| | | |
|---|---|---|
| 0323227 | 7/1989 | European Pat. Off. . |
| 0336970 | 10/1989 | European Pat. Off. . |
| 8914563 | 5/1990 | Germany . |
| 2220509 | 1/1990 | United Kingdom . |

*Primary Examiner*—Thomas C. Lee
*Assistant Examiner*—Le Hien Luu
*Attorney, Agent, or Firm*—Fitzpatrick, Cella, Harper & Scinto

[57] ABSTRACT

A method of recording information on a recording medium which is incapable of erasing and overwriting. The method uses an information processing system comprising an information recording apparatus to record and verify information to the recording medium. A controller is also used to control the recording apparatus, and a first computer is connected to the controller through a small computer interface. A plurality of logical blocks are provided on the recording medium, and different addresses are assigned to the blocks. When information is written to the blocks, a good status signal is provided when no error occurs. When an error occurs, the controller suspends the recording of the information, and produces sense data which comprises (i) an information byte indicative of an address of the logical block in which the error first occurred, and (ii) a last written block byte indicative of the address of the logical block in which the recording was last executed before the recording was suspended. When an error occurs, the host computer will send a command for retrying recording into a logical block next to the logical block indicated by the last written block byte of the sensed data. Thus, double recording can be prevented.

6 Claims, 9 Drawing Sheets

FIG.1
PRIOR ART

| SECTOR | | | |
|---|---|---|---|
| 0 | 1 | ---------------------------- | m |
| 0 | 1 | ---------------------------- | m |
| m+1 | m+2 | ---------------------------- | 2m+1 |
| | | ---------- | N |
| N+1 | N+2 | ---------------------------- | |
| | | ---------------------- P-1 | P |

TRACK 0, 1, ..., n → CYLINDER 0
0, 1, ..., n → CYLINDER 1
0, 1, ..., n → P

| BIT<br>BYTE | 7 | 6 | 5 | 4 | 3 | 2 | 1 | 0 |
|---|---|---|---|---|---|---|---|---|
| 0 | \multicolumn{8}{c}{OPERATION CODE (OAH)} |
| 1 | LOGICAL UNIT NUMBER | | | (MSB) | LOGICAL BLOCK ADDRESS | | | |
| 2 | LOGICAL BLOCK ADDRESS | | | | | | | |
| 3 | LOGICAL BLOCK ADDRESS | | | | | | | (LSB) |
| 4 | TRANSFER LENGTH | | | | | | | |
| 5 | 0 | 0 | RESERVED (0) | | | | 0 | 0 |

FIG.4
PRIOR ART

| BIT<br>BYTE | 7 | 6 | 5 | 4 | 3 | 2 | 1 | 0 |
|---|---|---|---|---|---|---|---|---|
| 0 | VALID | \multicolumn{3}{c}{ERROR CLASS(7)} | | | \multicolumn{3}{c}{ERROR CODE(0)} | | |
| 1 | \multicolumn{8}{c}{SEGMENT NUMBER(0)} | | | | | | | |
| 2 | FM(0) | EOM(0) | ILI(0) | R (0) | \multicolumn{4}{c}{SENSE KEY} | | | | |
| 3 | (MSB) | \multicolumn{7}{c}{INFORMATION BYTE} | | | | | | | |
| 4 | \multicolumn{8}{c}{INFORMATION BYTE} | | | | | | | | |
| 5 | \multicolumn{8}{c}{INFORMATION BYTE} | | | | | | | | |
| 6 | \multicolumn{7}{c}{INFORMATION BYTE} | | | | | | | (LSB) |
| 7 | \multicolumn{8}{c}{ADDITIONAL SENSE LENGTH (05H)} | | | | | | | | |
| 8<br>~11 | \multicolumn{8}{c}{(0)<br>(0)} | | | | | | | | |
| 12 | \multicolumn{8}{c}{SENSE CODE} | | | | | | | | |

| BIT<br>BYTE | 7 | 6 | 5 | 4 | 3 | 2 | 1 | 0 |
|---|---|---|---|---|---|---|---|---|
| 0 | VALID | \multicolumn{3}{c}{ERROR CLASS(7)} | | | \multicolumn{4}{c}{ERROR CODE(0)} | | | |
| 1 | \multicolumn{8}{c}{SEGMENT NUMBER(0)} | | | | | | | | |
| 2 | FM(0) | EOM(0) | ILI(0) | R (0) | \multicolumn{4}{c}{SENSE KEY} | | | | |
| 3 | (MSB) | \multicolumn{7}{c}{INFORMATION BYTE} | | | | | | | |
| 4 | \multicolumn{8}{c}{INFORMATION BYTE} | | | | | | | | |
| 5 | \multicolumn{8}{c}{INFORMATION BYTE} | | | | | | | | |
| 6 | \multicolumn{8}{c}{INFORMATION BYTE (LSB)} | | | | | | | | |
| 7 | \multicolumn{8}{c}{ADDITIONAL SENSE LENGTH (07H)} | | | | | | | | |
| 8<br>~11 | \multicolumn{8}{c}{(0)<br>(0)} | | | | | | | | |
| 12 | \multicolumn{8}{c}{SENSE CODE} | | | | | | | | |
| 13 | VALID | \multicolumn{7}{c}{(MSB)   LAST WRITTEN BLOCK} | | | | | | | |
| 14 | \multicolumn{8}{c}{LAST WRITTEN BLOCK (LSB)} | | | | | | | | |

METHOD FOR RETRYING RECORDING INFORMATION INTO A NEXT LOGICAL BLOCK BY SENDING SENSE DATA INCLUDING ADDRESS INFORMATION TO HOST COMPUTER AND RESPONDING TO COMMAND THEREFROM

BACKGROUND OF THE INVENTION

1. Field of the Invention

The invention relates to a method of recording and/or verifying predetermined information on an information recording medium on the basis of a command which is sent from a host computer through an SCSI (Small Computer System Interface).

2. Related Background Art

SCSI is an interface which has been examined in the Work Committee of ANSI (American National Standard Institute) X3T9.2 on the basis of the interface SASI (Shugart Associates System Interface) for connecting a small computer and its peripheral devices which is made by Shugart Associates Co., Ltd. of the U.S.A. and has been standardized as ANSI X3.131-1986. The SCSI is at present becoming a standard interface for connecting a personal computer and its peripheral devices. In recent years, on the other hand, work on standardizing SCSI-2 as an expanded version of the SCSI is being performed. However, the SCSI-2 standards are not yet finally determined. There are the following five points of the SCSI interface rules which are specified by the ANSI.

(1) Kinds and definitions of interface signals and timings for signal transmission and reception.

(2) A protocol to specify an operation sequence as an interface and definitions of phases or the like.

(3) Physical interface conditions of cable specifications, connector specifications, and the like, and electrical conditions of the electrical transmission system.

(4) A command system to execute various controls of the peripheral devices and a data transfer, formats of commands, and functions of the commands.

(5) A status byte format to designate the result of execution of the command to a host computer, and a structure for sense data to designate an abnormality state or the like during the execution of the command.

The command system in the above item (4) is as follows. First, the SCSI command is classified into eight kinds of groups. The first byte of a CDB (Command Descripter Block) is an operation code and its upper three bits designate a group code and its lower five bits designate a command code (code indicative of the kind of command) of every group. A length of CDB is specified as follows for every group.

(1) Group 0 . . . 6 bytes (2) Group 1 . . . 10 bytes (3) Groups 2–4 . . . reserved (4) Group 5 . . . 12 bytes (5) Groups 6–7 . . . vendor unique (specified by the manufacturer)

The CDB of the groups 6 and 7 denotes a group of commands which can be defined so as to be unique for the SCSI device. In each command, a logical block address is constructed by continuously arranging data blocks of a fixed length on a logical unit.

Figure 1:
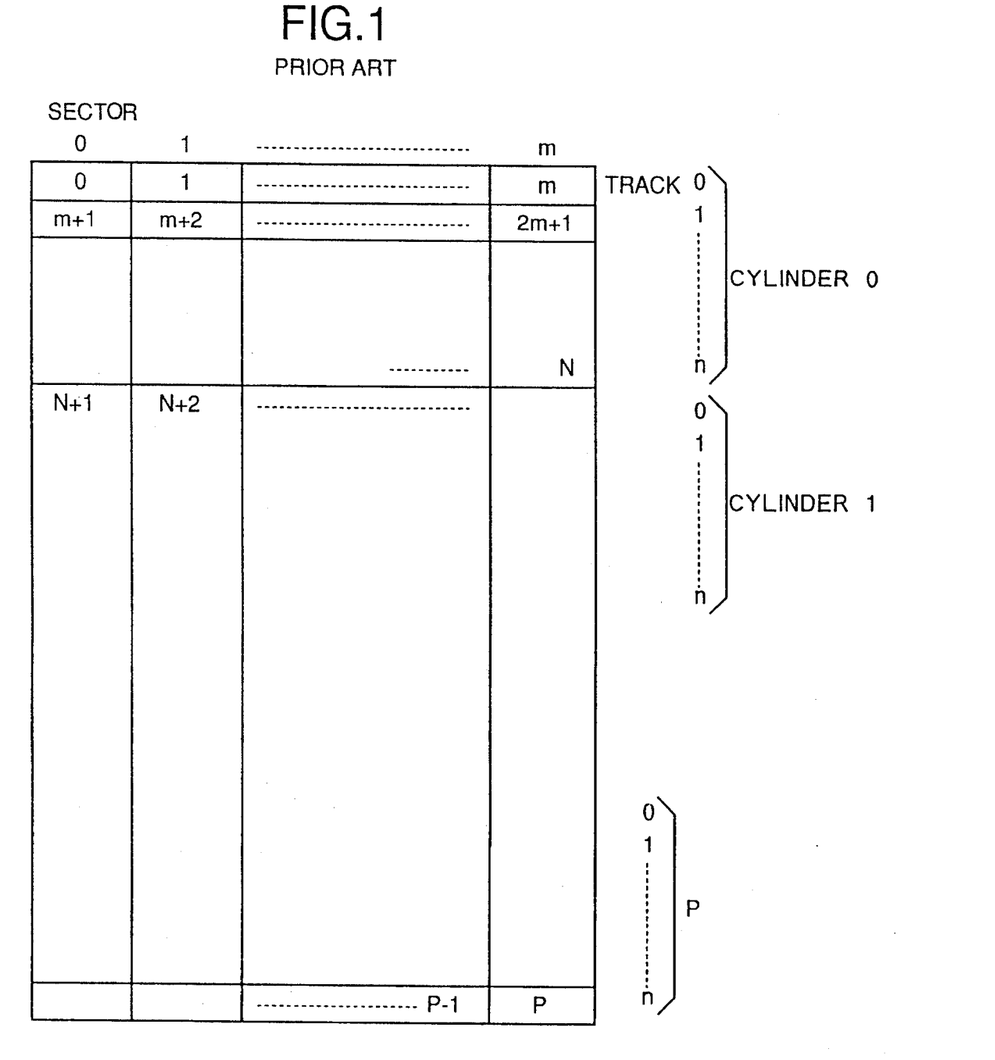
FIG. 1 is a schematic diagram showing a construction of logic blocks in a conventional hard disc device.

FIG. 1 is a diagram showing a construction of a logical block in a hard disc device. In FIG. 1, data block of a cylinder=0 and a sector=0 is set to a logical block address=0. Each time each of the sector, track, and cylinder is increased by "1" in accordance with this order, the logical block address is increased by "1". The logical block address is excellent with respect to a point that since an initiator (host computer) designates the logical block address of the first data block and the number of processing blocks and accesses the data, there is no need to be aware of a physical structure. Therefore, when the above logical block addressing is used, in the case where the devices in which the numbers of cylinders, tracks, sectors, and the like are different are connected, they can be made operative by the same software.

Figure 2:
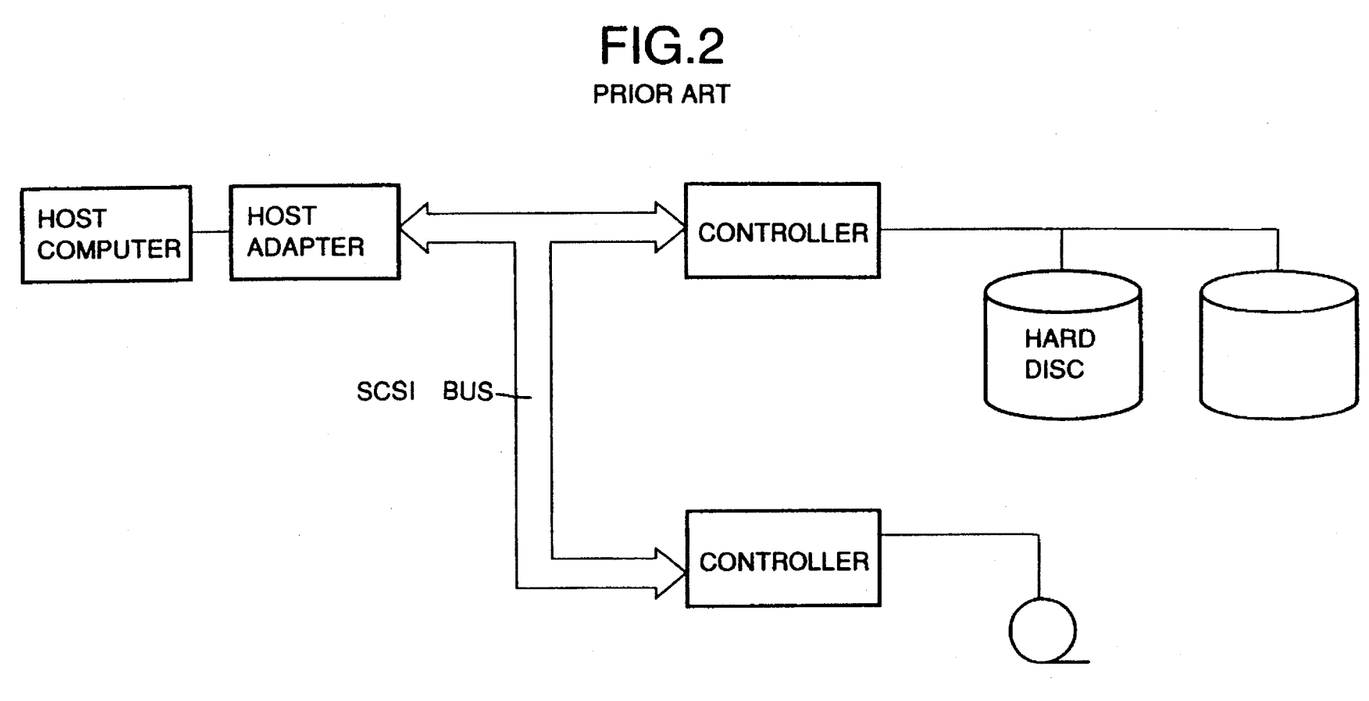
FIG. 2 is a block diagram showing a construction of a conventional general SCSI system.

FIG. 2 is a diagram showing a general example of a system construction of the SCSI. As a logical unit, generally, as shown in FIG. 2, a physical device such as a hard disc or the like is often connected. The logical unit number (LUN) can be assigned to the physical device or can be also assigned to a virtual device. In the SCSI, ordinarily, eight logical units of LUN=0 to 7 can be connected onto an SCSI bus. Further, by using an expansion message, up to 2048 logical units can be connected.

Figure 3:
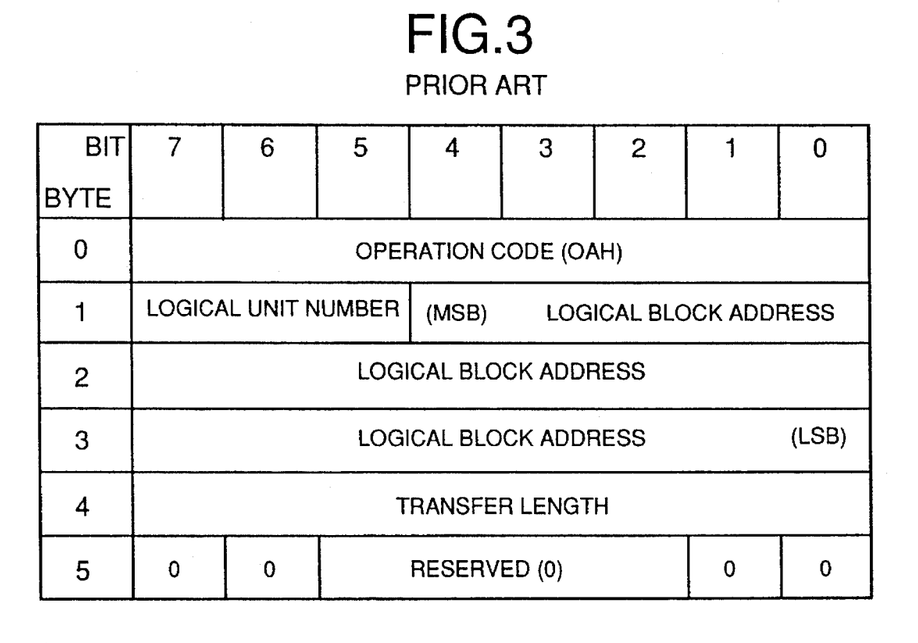
FIG. 3 is a schematic diagram showing an example of a construction of a write command in the conventional SCSI system.
Figure 4:
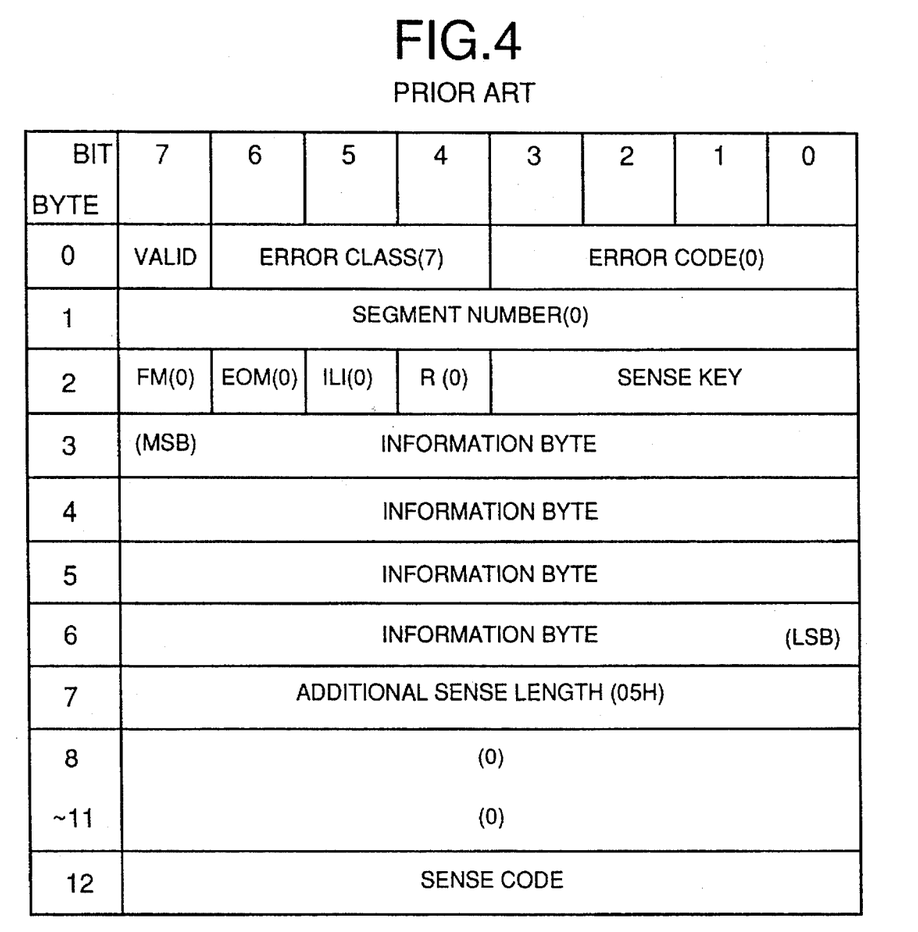
FIG. 4 is a schematic diagram showing an example of a construction of sense data in the conventional SCSI system.

FIG. 3 shows an example of the CDB of a Write command of the group 0. In FIG. 3, Logical Unit Number indicates a target logical unit of the command, Logical Block Address indicates a logical block which is executed at the first of the command, and Transfer Length indicates the number of logical blocks in which the commands are continuously executed, respectively. For instance, in case of the Write command, data is recorded into the continuous logical blocks as many as the number of logical blocks indicated by Transfer Length from the logical block address shown by Logical Block Address of the logical unit indicated by Logical Unit Number. In the SCSI interface, when the execution of the command is correctly finished, the target returns a good status to the initiator. On the other hand, when the execution of the command is incorrectly finished, the target returns a check condition status and also forms sense data as shown in, for example, FIG. 4. In FIG. 4, Valid indicates whether Information Bytes of the bytes 3 to 6 are valid or not. They are valid when Valid=1. Error Class and Error Code indicate a format of sense data. When Error Class=7 and Error Code=0, the data format indicates expansion sense data. Sense Key indicates the kind of error. Information Byte indicates a location (logical block) at which the error has occurred. Additional Sense Length indicates the number of bytes of additional sense data of the byte 8 and subsequent bytes. Sense Code indicates detailed information of the error.

When a check condition status is returned from the target in response to the command generated, the initiator generates a request status command and receives the sense data formed by the target and can know the kind of error from Sense Key and Sense Code. Or, when Valid=1, the initiator can know the location of the error from Information Byte. As mentioned above, when a command is given to a plurality of logical blocks, it is a general way that the target sets sense data at the time point of the occurrence of the error and finish the execution of the command by the check condition status. For instance, in case of a Read command of five continuous logical blocks of the logical blocks 1 to 5, when a read error occurs during the reading operation of the logical block 3, the target sets Sense Key in the sense data into 3h (Medium Error), sets Sense Code into 11h (Read Error), sets Information Byte into 3 (logical block in which the error has occurred), sets Valid into 1 to indicate that the information byte is valid, and returns the check condition status. The initiator receives the sense data by a request status command and again generates the Read command from the logical block 3 shown in Information Byte, thereby making it possible to retry to eliminate the error. As described above, Information Byte generally indicates the logical block address at which the initiator should subsequently retry.

On the other hand, as conventional information recording media, a floppy disk for magnetically recording and reproducing, an optical information recording medium for optically performing the recording and reproduction, and the like are known. As forms of the optical information recording medium, various types of a disk shape, a card shape, a tape shape, and the like are known. Among such optical information recording media, a card-shaped optical information recording medium (hereinafter, called an optical card) is small and light and is conveniently portable, so that a large demand is expected as an information recording medium of a relatively large capacity. The information recording medium is classified into two types such as a type in which information can be erased and rewritten and a type in which the recorded information cannot be erased and rewritten in accordance with the characteristics of the medium. Generally, the optical card is of the unerasable and unrewritable type and the application in the field such as a medical field or the like in which a feature such that the recorded information cannot be rewritten becomes advantageous is expected. In the recording/reproducing apparatus of such an optical card, in general, the optical card and a light beam for recording and reproducing are relatively reciprocated and information is recorded onto and reproduced from the recording surface of the optical card. In order to position the light beam to a desired track on the recording surface, light beam control techniques such as automatic focusing (AF), automatic tracking (AT), and the like are used.

Although the optical card is generally the type in which the information cannot be erased and rewritten as mentioned above, there are the following problems in the case where the Write command to a plurality of blocks is generated to such an optical card and the automatic tracking (AT) is made inoperative during the recording of a certain logical block (sector) on one track. That is, when it is now assumed that the logical block address in which the AT had been made inoperative has been set into Information Byte, the initiator tries to retry (to write in this case) from such a logical block. However, some recording has already been performed (there is no guarantee such that information has correctly been recorded) in the logical block before the AT is made inoperative. Therefore, information is overwritten onto the recorded information, so that the correct recording cannot be expected.

The case of a Write and Verify command will now be similarly considered. In the case where a plurality of logical blocks (sectors) are arranged on one track as in the optical card or optical disc, by repeating the operations to write and verify information every sector, processes such that information is written in a lump into the logical blocks existing on the same track in the logical block range designated by the CDB of the command and the written information is verified in a lump after that are executed. Since the processing time is reduced by processing every track as mentioned above, such a method is generally used. However, in the case where the AT had been made inoperative during the execution of the writing operation of the Write and Verify command for performing such processes, if the logical block address in which the AT had been made inoperative has been set into Information Byte, the following problem occurs in addition to the problem similar to those in case of the Write command mentioned above. That is, although the recording operation was executed to the logical block which had been recorded until a time point at which the AT has been made inoperative, the verifying operation is not executed. Therefore, there is a problem such that in spite of the fact that there is no guarantee such that the data has correctly been recorded, there is no means of informing a fact that the verifying operation is not executed to the initiator, so that the reliability of the data deteriorates.

As described above, in the conventional information recording/reproducing method of recording and reproducing predetermined information onto/from the information recording medium on the basis of the command from the host computer through the SCSI, there is only Information Byte as information to judge the block to be subsequently retried by the initiator. Further, the logic block address in which the actual error has occurred is set into Information Byte. Accordingly, in the case where an error occurs in the command such as Write command or Write and Verify command accompanied with the recording operation for the unerasable and unrewritable medium, there is a case where the information set into Information Byte is not effectively useful as information for the retry that is executed by the initiator. There are drawbacks such that a vain retry occurs in the retrying process at the time of occurrence of the error and the processing time increases and the reliability of the data deteriorates.

SUMMARY OF THE INVENTION

It is an object of the invention to solve the problems in the conventional techniques mentioned above and to provide an information recording method which can remarkably reduce the processing time upon occurrence of an error and can improve the reliability of data.

According to the present invention, the above object is accomplished by a method of recording information onto a recording medium by using an information processing system comprising an information recording apparatus for recording information onto the recording medium, a controller to control the information recording apparatus, and a host computer which is connected to the controller through a small computer interface, wherein the above method comprises the steps of: setting a plurality of logical blocks to the recording medium; assigning different logical block addresses to the logical blocks; sending a write command to designate some of the logical blocks into which information is recorded from the host computer to the controller through the small computer interface; controlling the information recording apparatus by the controller so as to record the information into the logical blocks designated by the write command; sending a good status signal indicative of the completion of the recording from the controller to the host computer through the small computer interface in the case where no error occurs until the completion of the recording of the information into all of the logical blocks designated by the write command; stopping the recording by the controller when an error occurs during the recording of the information; producing sense data by the controller when the error occurs during the recording of the information, in which the sense data is constructed by an information byte indicative of the address of the logical block in which the error has first occurred in the case where it is seen as a command and a last written block byte indicative of the address of the logical block in which the recording has been executed at last before the recording is stopped; and sending a check condition status signal indicative of the occurrence of the error from the controller to the host computer through the small computer interface when the error occurs during the recording of the information.

DETAILED DESCRIPTION OF THE PREFERRED EMBODIMENT

Figure 5:
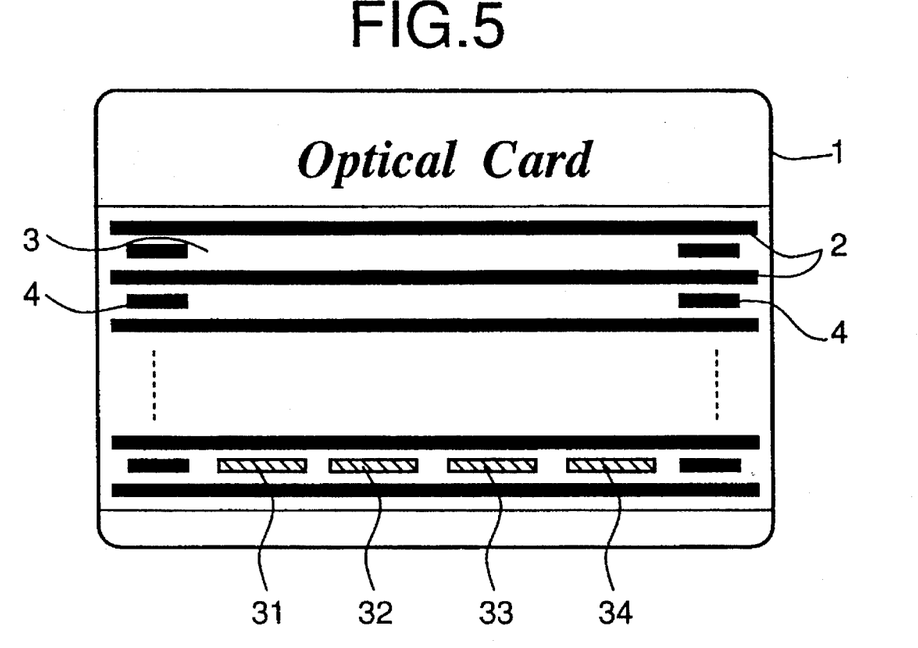
FIG. 5 is a plan view showing an example of a format of an optical card which is used as a recording medium in the present invention.

An embodiment of the invention will be described in detail hereinbelow with reference to the drawings. A construction of an optical card used as an information recording medium in an information recording/reproducing method of the embodiment will be first explained. FIG. 5 is a plan view showing an example of the optical card. A plurality of tracking tracks 2 are formed in parallel on an optical card 1. A data track 3 to record information is provided between the adjacent tracking tracks 2. Physical track numbers 4 indicative of the physical position of the data track 3 have previously been formated at both edges of the data track 3. Four sectors 31, 32, 33, and 34 (sector numbers 1 to 4) per track are arranged on the data track 3. As for the physical track number 4, the lower edge side of the optical card 1 is set to the number 0 and as the position approaches the upper edge side, the number increases and is set to 2499 at the top edge. That is, 2500 data tracks 3 are provided on the optical card 1 and 10000 sectors are arranged. The sectors on the optical card 1 correspond to the logical blocks of the SCSI. The sector 1 of the physical track 0 corresponds to the logical block 0 and the sector 4 corresponds to the logical block 3. The sector 1 of the physical track 1 corresponds to the logical block 4. The sector 4 of the physical track 2499 corresponds to the logical block 9999.

Figure 6:
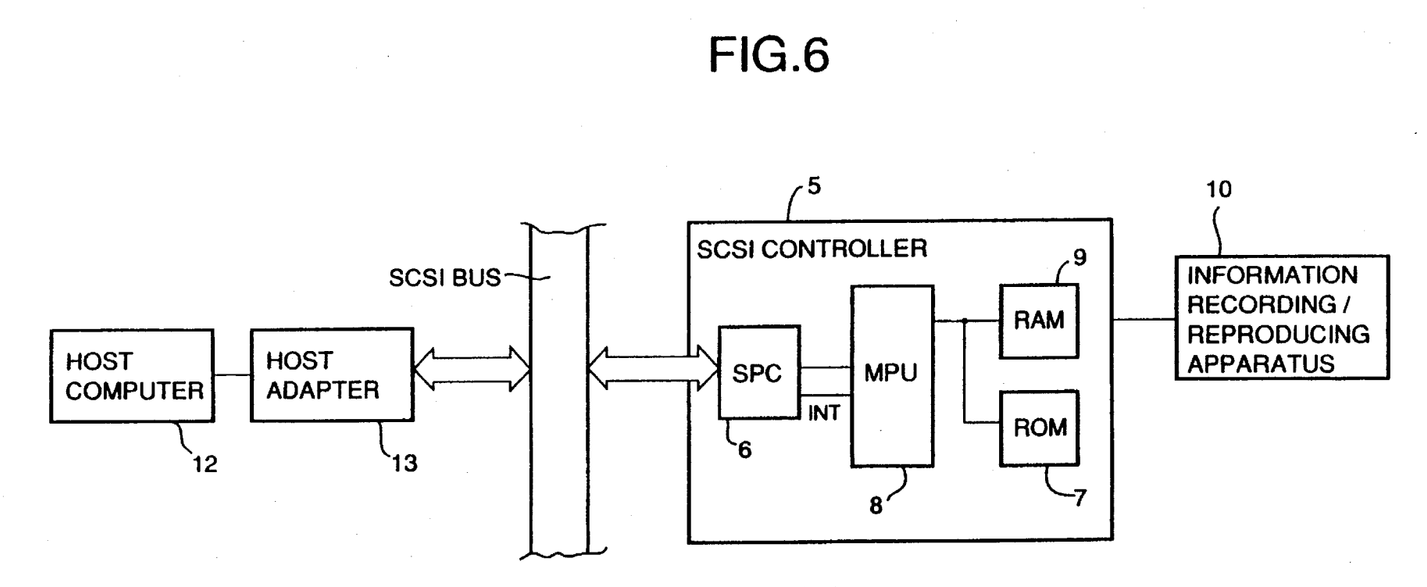
FIG. 6 is a schematic diagram showing an embodiment of a construction of a partition command signal which is used in the invention.

FIG. 6 is a block diagram showing an example of an SCSI system according to the information recording/reproducing method of the invention. In FIG. 6, reference numeral 5 denotes an SCSI controller. The SCSI controller 5 comprises: an SCSI protocol circuit (SPC) 6 to perform a sequence control of an SCSI signal on the basis of the SCSI standards; a micro processing unit (MPU) 8 as a control unit to control the SCSI controller 5 in accordance with a program stored in a read only memory (ROM) 7; and a random access memory (RAM) 9 which is used as a buffer memory to record and reproduce data or is used to store sense data or the like. An information recording/ reproducing apparatus 10 is connected to the SCSI controller 5. The optical card 1 described in FIG. 5 is inserted into the information recording/reproducing apparatus 10 and information is recorded or reproduced on the basis of a command from a host computer 12. In FIG. 6, reference numeral 13 denotes a host adapter.

Figure 8:
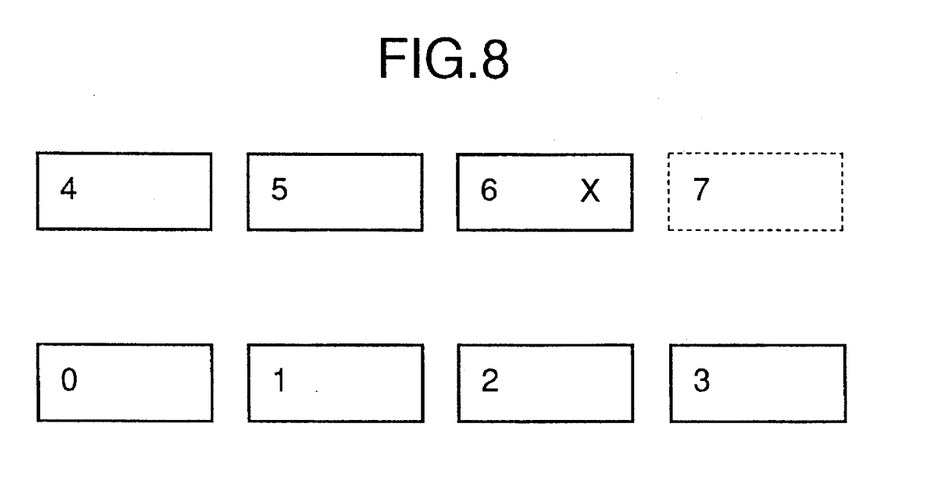
FIG. 8 is a schematic diagram showing an example of a state of error generation in the method of the invention.
Figure 9:
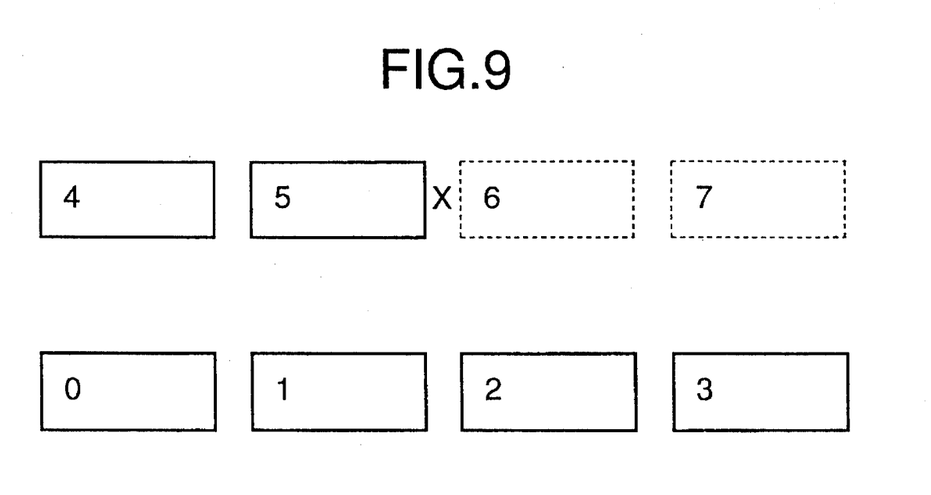
FIG. 9 is a schematic diagram showing another example of a state of error generation in the method of the invention.

FIGS. 8 and 9 are diagrams for explaining the information recording/reproducing method of the embodiment and showing recording states on the optical card 1. In FIGS. 8 and 9, a rectangle shown by a solid line indicates a recorded logical block (sector), a rectangle shown by a broken line indicates a logical block in which no information is recorded, reference numeral in each rectangle indicates a logical block address, and a mark "x" indicates a generation position of an error. In FIGS. 8 and 9, it is now assumed that the data has already been recorded in the logical blocks 0 to 3 and a recording command of four blocks of the logical blocks 4 to 7 has been generated from the host computer 12. In this instance, when the recording processes of all of the logical blocks are correctly finished, the SCSI controller 5 returns a good status signal to the host computer 12 through an SCSI bus. It is now assumed that the automatic tracking (AT) had been made inoperative during the recording of the logical block 6 in FIG. 8 and a write error occurred in the logical block 6. In this instance, the SCSI controller 5 sets the sense data into the RAM 9 and returns a check condition status signal to the host computer 12 through the SCSI bus.

When the check condition status signal is received, the host computer 12 sends the request status signal to the SCSI controller 5 through the SCSI bus. When the request status signal is received, the SCSI controller 5 sends the sense data stored in the RAM 9 to the host computer 12 through the SCSI bus. By analyzing the transmitted sense data, the host computer 12 can know which kind of error has occurred in which logical block, so that the host computer 12 instructs the SCSI controller 5 to take a necessary countermeasure such as retry or the like for the error.

Figure 7:
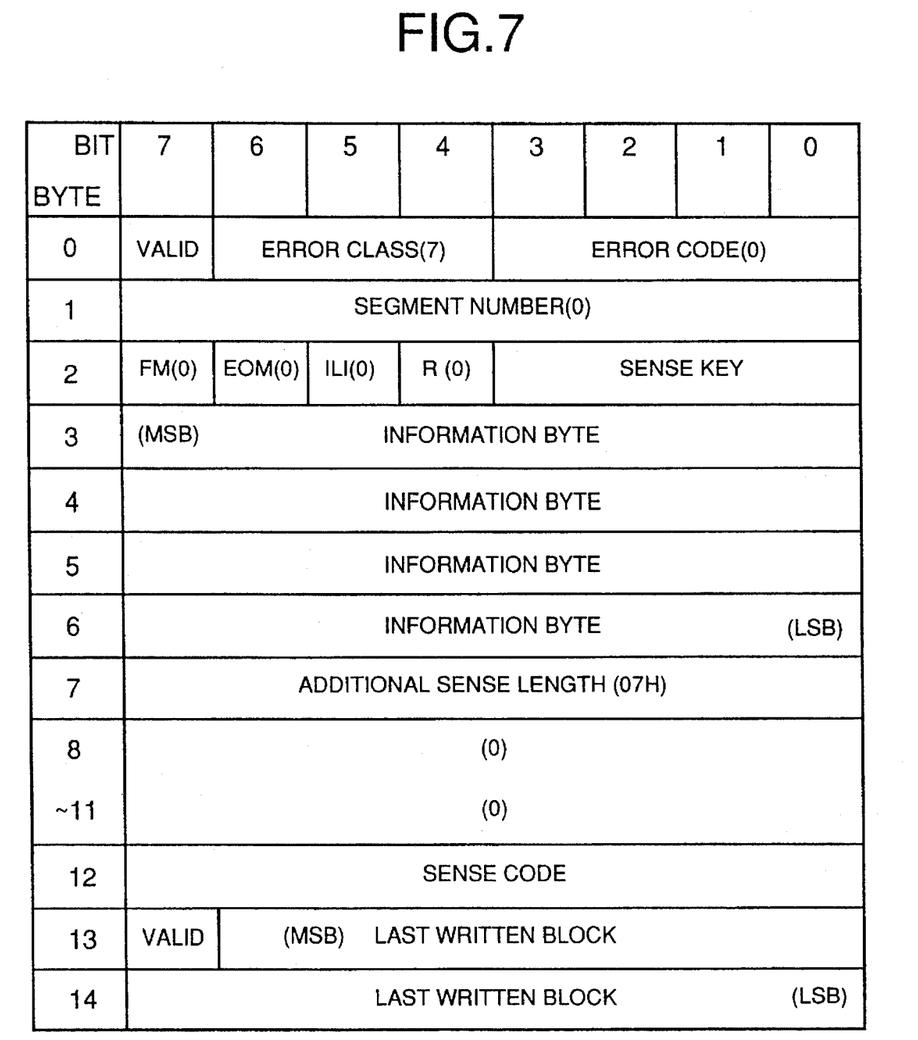
FIG. 7 is a schematic diagram showing an embodiment of sense data which is used in a method of the invention.

FIG. 7 is a diagram showing the sense data which is used in the information recording/reproducing method of the embodiment. In the information recording/reproducing method of the embodiment, an address of "the block in which the error has first occurred in the case where it is seen as a command" is set into Information Byte in the sense data that is set in the case of the occurrence of the error by the command accompanied with the recording operation. An address of "the last logical block in which the recording (it is assumed that even if the recording was interrupted on the way of the block due to an error or the like, the recording has been executed) has been executed" is set into Last Written Block. In FIG. 7, Valid of the bit 7 of the byte 14 indicates whether Last Written Block is valid or not. When Valid=1, Last Written Block is valid. In the example of FIG. 8, 6 is set into both of Information Byte and Last Written Block. When the automatic tracking (AT) is made inoperative, Sense Key is set into 3$h$ (Medium Error) and Sense Code is set into 09$h$ (Focusing/Tracking Servo Failure).

As shown in FIG. 9, the case where the AT is made inoperative just after completion of the recording of the logical block 5 will now be considered. In this case, 6 (the first block in which the Write command is not executed) is set into Information Byte and 5 (the last block in which the recording has been performed) is set into Last Written Block. In both of the above cases, 6 has been set into Information Byte. However, the initiator can judge the logical block to be retried next with reference to Last Written Block. That is, in the former case (FIG. 8), since Last Written Block is set to 6, some recording has already been performed in the logical block 6. It is sufficiently presumed that even if the Write command is generated to the logical block 6, the information is overwritten and the information is not correctly recorded. Therefore, it is proper to generate the Write command to the next logical block 6. In the latter case (FIG. 9), since Last Written Block is set to 5, it will be understood that nothing is recorded in the logical block 6. Therefore, it is proper to generate the Write command to the logical block 6.

The case where the command is the Write and Verify command and the AT has been made inoperative during the writing process will now be considered with respect to the examples of FIGS. 8 and 9. Since the Write and Verify command is completed only when both of the writing process and the verifying process are finished, when an error occurs during the writing process, the command is not correctly finished in any one of the blocks. Therefore, in both of the cases of the above two examples, 4 is set into Information Byte. 6 is set into Last Written Block in the former case (FIG. 8) and 5 is set in the latter case (FIG. 9). In this case, since the initiator can know that the writing process has been executed until the block shown in Last Written Block, the result of the recording can be verified by the Read command or Verify command. Similarly, when an error such as a Verify error or the like occurs during the verifying process after the writing process until the logical block 7 was finished, 7 is set into Last Written Block in both of the above cases and the logical block in which a Verify error has occurred is set into Information Byte. In case of the Verify error, Sense key is set into 3h (Medium Error) and Sense Code is set into 0Ch (Write Error). In this case, since the initiator (host computer) can know that all of the recording processes have been completed from Last Written Block, it is sufficient to perform the verification of the logical block having a Verify error and subsequent blocks and the retry of the block having a Verify error.

Figure 10:
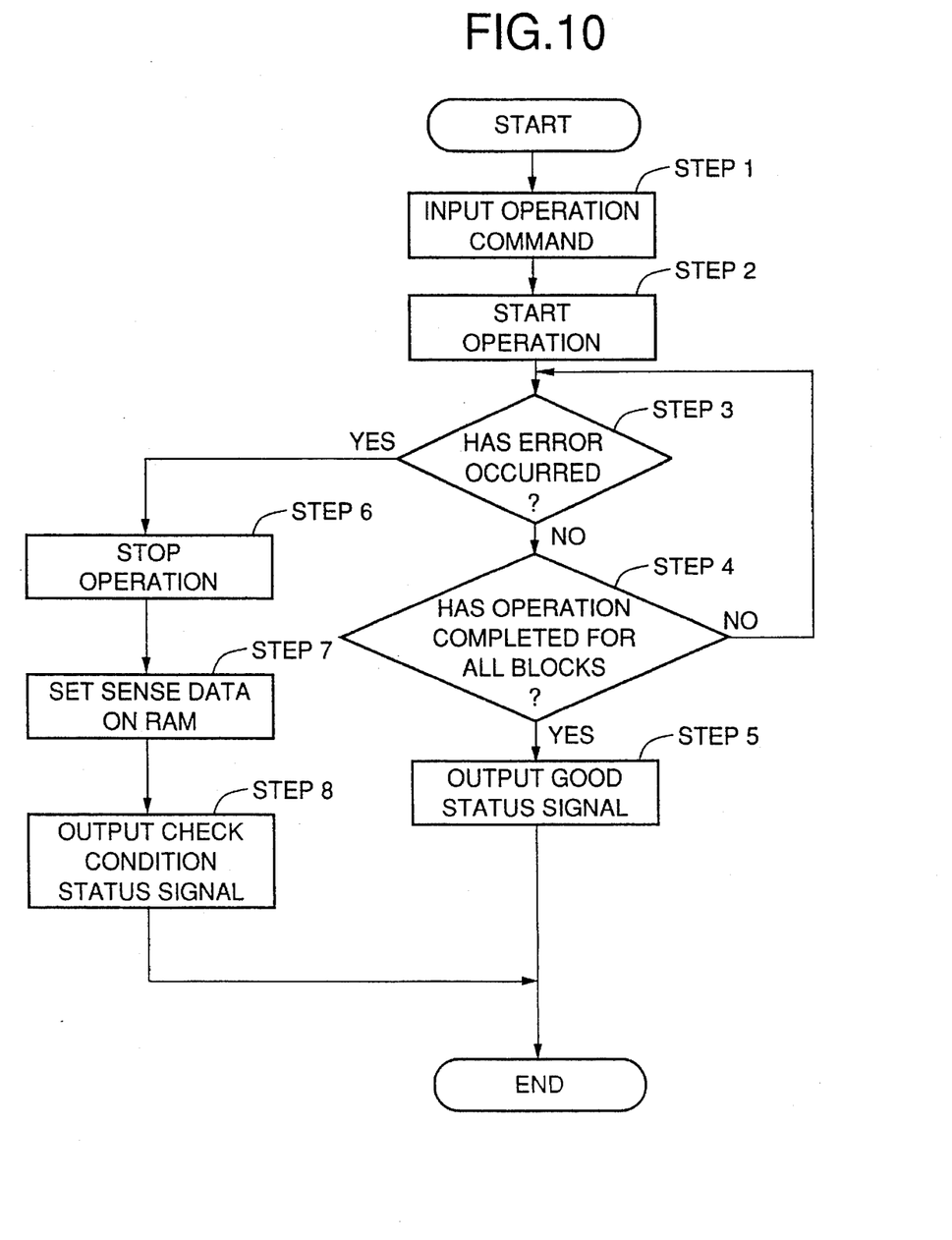
FIG. 10 is a flowchart for explaining an embodiment of an information recording method of the invention.

FIG. 10 is a flowchart for explaining the information recording method of the invention. In FIG. 10, in first step 1, an operation command is supplied from the host computer to the controller through the SCSI. The operation command is the Write command or the Write and Verify command. The processing routine advances to step 2 and the operation, that is, only the recording operation or both of the recording and verifying operations are started.

In step 3, a check is made to see if an error has occurred during the operation or not. If NO, step 4 follows and a check is made to see if the operations have been completed for all of the logical blocks or not. If NO in step 4, the operation is continued and a check is again made in step 3 to see if an error has occurred or not. The processes in steps 3 and 4 are repeated until the operations are completed for all of the logical blocks.

If YES in step 4, step 5 follows and the controller generates a good status signal indicating that no error occurs to the host computer through the SCSI.

On the other hand, if it is determined in step 3 that the error has occurred, step 6 follows and the operation is stopped. In the next step 7, sense data is formed and set into the RAM in the controller.

The sense data comprises Information Byte and Last Written Block Byte. Information Byte indicates the address of "the block in which the error has first occurred when it is seen as a command", "the block in which the error has first occurred when it is seen as a command" denotes that the error has occurred at a stage of which command. Therefore, when the operation command in step 1 is the Write command, the address 6 is set into Information Byte in both of the cases of FIGS. 8 and 9. When the operation command in step 1 is the Write and Verify command, since the error has occurred before completion of the Write and Verify command until the addresses 4 to 7, the address 4 is set into Information Byte.

The address of "the last logical block in which the recording has been executed" is set into Last Written Block Byte. In case of FIG. 8, therefore, since the error has occurred during the recording of the logical block of the address 6, the address 6 is set into Last Written Block Byte. On the other hand, in case of FIG. 9, since the error has occurred before the recording is executed to the logical block of the address 6, the address 5 is set into Last Written Block Byte.

After step 7, step 8 follows and the controller supplies the check condition status signal to the host computer through the SCSI.

According to the information recording method of the invention as described above, when an error occurs by the command accompanied with the recording operation, "the block in which the error has first occurred when it is seen as a command" is set into Information Byte in the sense data and "the last logical block in which the recording has been executed" is set into another byte different from Information Byte in the sense data. Therefore, the last block which is useful for the initiator to perform the retry and in which the recording has actually been completed can be given as information. The initiator doesn't perform a vain retry so as to execute the recording to a block in which a Write error (overwriting) will obviously occur. There is an effect such that the processing time can be remarkably reduced as compared with that in the conventional method. On the other hand, even in case of a command such as a Write and Verify command to execute the compound operations, the initiator doesn't perform a vain retry such as to again record the same information as the information recorded in the block in which the writing process has already been finished to another location by the retry. The processing time can be reduced. The information regarding the block in which the verifying process is not yet executed although the writing process has already been performed can be accurately reported to the initiator. Thus, the reliability of the data can be improved.

What is claimed is:

1. A method of recording information to a recording medium, incapable of erasing an overwriting, by using an information processing system comprising an information recording apparatus to record information to the recording medium, a controller to control said information recording apparatus, and a host computer which is connected to said controller through a small computer interface, comprising the steps of:

setting a plurality of logical blocks to said recording medium;

assigning different logical block addresses to said logical blocks;

sending a Write command to designate some of said logical blocks into which the information is recorded from said host computer to said controller through said small computer interface;

controlling said information recording apparatus by the controller so as to record the information into the logical blocks designated by said Write command, sending a good status signal indicative of the completion of the recording from the controller to the host computer through the small computer interface when no error occurs until the completion of the recording of the information into all of the logical blocks designated by said Write command;

causing the controller to suspend the recording when an error occurs during the recording of the information;

causing the controller to produce sense data when the error occurs during the recording of the information, said sense data comprising (i) an information byte indicative of an address of the logical block in which the error has first occurred when it is seen as a command, and (ii) a last written block byte indicative of an address of the logical block in which the recording has finally been executed before the recording is suspended;

sending a check condition status signal indicative of the occurrence of the error from the controller to the host computer through the small computer interface when the error occurs during the recording of the information;

sending a request status signal from the host computer to the controller through the small computer interface when the host computer receives the check condition status signal;

sending the sensed data from the controller to the host computer through the small computer interface when the controller receives the request status signal; and causing the host computer to send a Write command for retrying recording into a logical block next to the logical block indicated by the last written block byte of the sensed data, to the controller through the small computer interface.

2. A method according to claim 1, further comprising the step of setting said generated sense data into a memory in said controller.

3. A method according to claim 1, wherein said recording medium comprises an optical card on which a plurality of tracks are provided, each track having a plurality of sectors, and each of the logical blocks corresponding to each of said sectors.

4. A method of recording and verifying information to a recording medium, incapable of erasing and overwriting, by using an information processing system comprising an information recording apparatus to record and verify information to the recording medium, a controller to control said information recording apparatus, and a host computer which is connected to said controller through a small computer interface, comprising the steps of:

setting a plurality of logical blocks to said recording medium;

assigning different logical block addresses to said logical blocks;

sending a Write and Verify command to designate some of the logical blocks in which the information is recorded and verified, from said host computer to said controller through said small computer interface;

controlling said information recording apparatus by the controller so as to record and verify the information to the logical blocks designated by the Write and Verify command;

sending a good status signal indicative of the completion of the recording and verification from the controller to the host computer through the small computer interface when no error occurs until the completion of the recording and verification of the information to all of the logical blocks designated by the Write and Verify command;

causing the controller to suspend the recording or verification when an error occurs during the recording or verification of the information;

causing the controller to produce sense data when the error occurs during the recording or verification of the information, said sensed data comprising (i) an information byte indicative of an address of the logical block in which the error has first occurred when it is seen as a command, and (ii) a last written block byte indicative of an address of the logical block in which the recording has finally been executed before the recording is suspended;

sending a check condition status signal indicative of the occurrence of the error from the controller to the host computer through the small computer interface when the error occurs during the recording or verification of the information;

sending a request status signal from the host computer to the controller through the small computer interface when the host computer receives the check condition status signal;

sending the sensed data from the controller to the host computer through the small computer interface when the controller receives the request status signal; and causing the host computer to send a Write and Verify command for retrying recording and verifying into a logical block next to the logical block indicated by the last written block byte of the sensed data, to the controller through the small computer interface.

5. A method according to claim 4, further comprising the step of setting said generated sense data into a memory in said controller.

6. A method according to claim 4, wherein said recording medium comprises an optical card on which a plurality of tracks are provided, each track having a plurality of sectors, each of said logical blocks corresponding to each of said sectors.

* * * * *